Jan. 10, 1939.  B. NIER  2,143,495
LANTERN
Filed May 14, 1938  3 Sheets-Sheet 1

Inventor:
B. Nier
By: Glascock Downing & Seebold
Attys.

Jan. 10, 1939.  B. NIER  2,143,495
LANTERN
Filed May 14, 1938   3 Sheets-Sheet 2
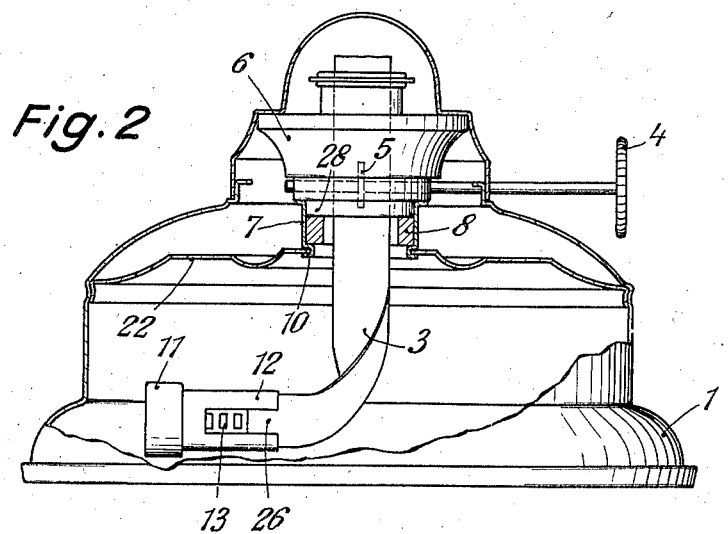
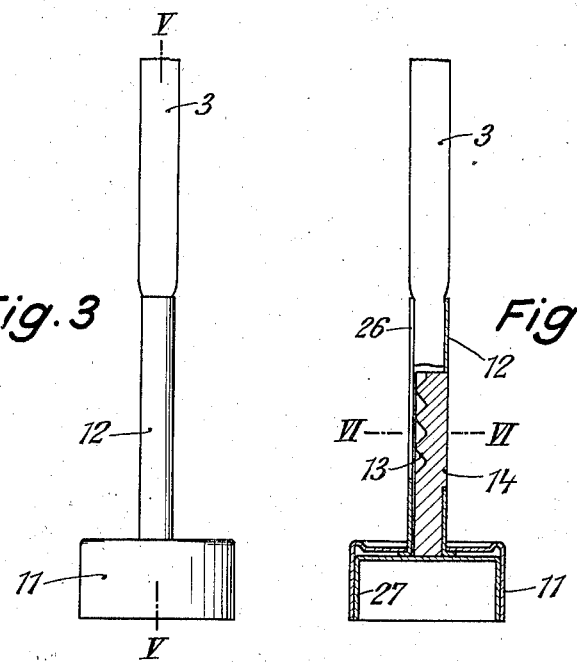
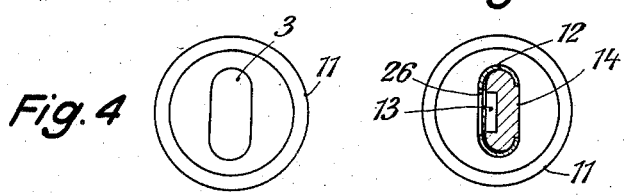
Inventor:
B. Nier
By Glascock Downing & Seebold Attys Jan. 10, 1939. B. NIER 2,143,495
LANTERN
Filed May 14, 1938 3 Sheets-Sheet 3
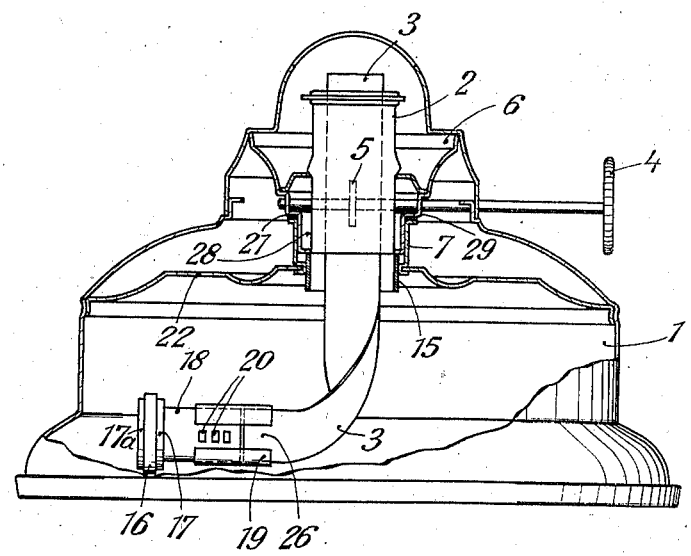
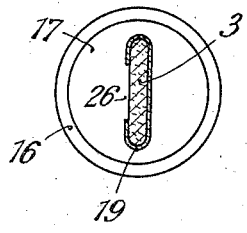
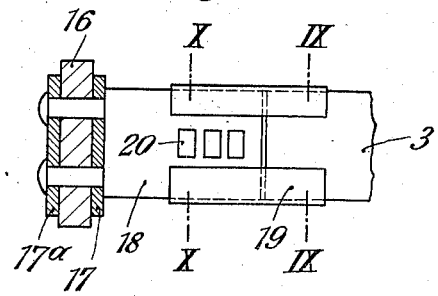
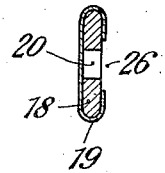
Inventor:
B. Nier
By: Glascock Downing & Seebold
Attys.

Patented Jan. 10, 1939

2,143,495

UNITED STATES PATENT OFFICE 2,143,495

LANTERN

Bruno Nier, Beierfeld, Germany

Application May 14, 1938, Serial No. 208,003
In Germany May 15, 1937

8 Claims. (Cl. 240—28)

My invention relates to lanterns, and particularly to hurricane lanterns, and has for its object the provision of a cheap and reliable seal by which escape of oil from their reservoirs is absolutely prevented so that the lanterns, when not in use, can be carried and packed in any desired position.

Escape of oil is undesirable under all conditions, especially because the escaping oil dirties the lanterns altogether.

Many attempts have been made with a view to providing a suitable seal but have failed because the seals were too complicated and expensive for hurricane lanterns which should be cheap articles, and were not reliable.

With the object of providing a simple and reliable seal for the purpose specified, I arrange, in combination with the usual elements of a lantern, sealing means, such as a sleeve, between the reservoir and the wick tube, and on the wick, and preferably at its lower end, I provide a sealing member for cooperation with the sealing means. The sealing member may be equipped with a packing which enters the sleeve when the wick has been raised into its topmost position by the wick-raising pinion. By these means, a simple and reliable seal for the reservoir is obtained, without any appreciable increase in the cost of the lantern.

In the accompanying drawings, a seal in which a packing ring is inserted in the sleeve, and made of elastic or resilient material, in combination with a plug at the lower end of the wick as the sealing member; and a seal in which, conversely, the sealing member supports the packing element, are illustrated by way of example.

In the drawings—

Fig. 2 is a partly sectional elevation of the reservoir of the lantern, showing the plug in its inactive position on the bottom of the reservoir.

Fig. 3 is an elevation of the sealing member.

Fig. 4 is a plan view of the member.

Fig. 5 is a section on the line V—V in Fig. 3.

Fig. 6 is a section on the line VI—VI in Fig. 5.

Fig. 7 is a partly sectional elevation of a reservoir showing the sealing member which supports the packing ring, in its inactive position on the bottom of the reservoir.

Fig. 8 is an elevation of the sealing member.

Fig. 9 is a section on the line IX—IX in Fig. 8, and

Fig. 10 is a section on the line X—X in Fig. 8.

Figure 1:
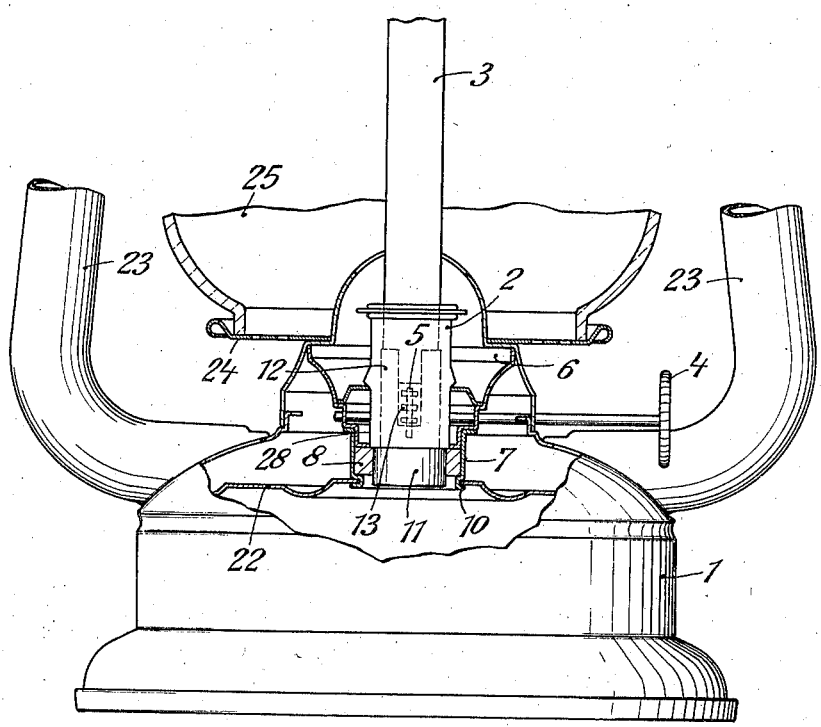
Fig. 1 is a partly sectional elevation showing the lower portion of a hurricane lantern, with the plug in sealing position in the packing ring.

Referring now to the drawings, and first to Figs. 1 to 6, the hurricane lantern is constructed in the usual manner, with a reservoir 1 and a pair of tubes 23 attached to the top of the reservoir. A horizontical partition 22 is arranged below the top of the reservoir, and a sleeve 7 is inserted in a central hole in the partition as the burner seat. The burner 6, with the wick tube 2, is inserted in the burner seat 7. The burner 6 supports a gallery 24 for the globe 25. A wick-raising pinion 5, with a spindle and a knurled hand wheel 4 on the free end of the spindle, operates the wick 3 in the wick tube 2.

The lower end of the wick 3 is inserted in a flat sheath 12, as best seen in Figs. 3 to 6. The cross-section of the sheath is so determined that the sheath can enter the wick tube 2 but moves clear of a packing ring 8, of suitable resilient material, which is inserted in the burner seat, or sleeve, 7 just above the partition 22. The sheath 12 is slotted in one of its faces, at 26, for admitting the wick-raising pinion 5. The lower end of the sheath is flanged, Fig. 5. The lower side of the flange supports a hollow piston 27 on which is placed a plug 11, also hollow, and the bottom of this plug is supported by the upper side of the flange. A rack 13 is inserted in the lower portion of the sheath 12, and a step 14 on the rack is inserted in a slot in that side of the sheath which is opposite the slot 26.

The packing ring 8 is held against axial displacement in the sleeve 7 by the bead 10 with which the lower end of the sleeve 7 is secured in the central hole of the partition 22 and which supports the lower side of the ring, and by the burner base 28 which engages the upper side of the ring. The inside diameter of the ring is somewhat less than the outside diameter of the plug 11.

Normally, the sealing member 11, 12 rests on the bottom of the reservoir as shown in Fig. 2. When it is desired to seal the reservoir, the wick 3 is raised by turning the hand wheel 4, until the plug 11 has been drawn into the packing ring 8, as shown in Fig. 1, and abuts against the lower end of the wick tube 2 which receives the sheath 12. As mentioned, the outside diameter of the plug 11 is greater than the inside diameter of the packing ring 8, and so an absolutely tight seal is effected by the resilient reaction of the ring against the plug. The plug is held in its sealing position by the teeth of the pinion 5 engaging in the rack 13 through the slot 26. The upper portion of the wick 3 extends into the globe, or chimney, 25 and cannot get into contact with any object outside the lantern. When the lantern is to be used, the wick 3 is lowered by turning the hand wheel 4 in the opposite direction until it has returned into the position illustrated in Fig. 2.

The normal wick-raising pinion is used for the operation of the seal, without any extra equipment and extra cost, except the very low cost of the sealing member and the packing ring. The great simplicity of the device is obvious, and its manipulation is quite easy, all that is required being turning the hand wheel 4 in opposite directions.

Referring now to Figs. 7 to 10, the burner, burner seat, and wick tube are arranged as described with reference to the previously described seal. However, the base 28 of the burner 6 has a shoulder 29, and a packing washer 21 is inserted between the shoulder and a flange at the upper end of the sleeve 7. A sleeve 15, without a packing ring, is attached to the burner base 28 and projects through the bead holding the sleeve 7 in the central hole of the partition 22.

A sheath 19, with a slot 26 in one of its sides, is secured on the lower end of the wick, as described with reference to Figs. 3 to 6, and a rack 18, with holes 20 defining teeth for the pinion 5, is inserted in the lower portion of the sheath. A circular plate 17 is secured to, or made integral with, the lower end of the rack 18, and a packing disk 16 is inserted between this plate and a similar plate 17a which plates are connected by rivets or other suitable means. For the reason stated, the outside diameter of the packing disk 16 is greater than the inside diameter of the sleeve 15.

In operation, the wick 3 is raised until the upper side of the plate 17 at the lower end of the rack 18 abuts against the lower end of the wick tube 2, and the disk 16 now makes an absolutely tight seal with the inner wall of the sleeve 15.

While my improved seal has been described for a hurricane lantern, it is understood that it may be applied to lanterns, or lamps, of other kinds.

I claim:

1. In a lantern, an oil reservoir, a wick tube, a wick in the tube, means for raising the wick, sealing means arranged between the reservoir and the lower end of the wick tube, and a sealing member on the wick, for making a seal with the sealing means when the wick has been raised into its topmost position by the raising means.

2. In a lantern, an oil reservoir, a wick tube, a wick in the tube, means for raising the wick, sealing means arranged between the reservoir and the lower end of the wick tube, a sealing member on the wick, for making a seal with the sealing means when the wick has been raised into its topmost position by the raising means, and means for effecting a positive engagement between the raising means and the sealing means in the said topmost position.

3. In a lantern, an oil reservoir, a wick tube, a wick in the tube, means for raising the wick, a packing ring of resilient material, means for holding the ring against axial displacement between the reservoir and the lower end of the wick tube, and a sealing member on the wick, for entering the ring when the wick has been raised into its topmost position by the raising means.

4. In a lantern, an oil reservoir, a wick tube, a wick in the tube, means for raising the wick, tubular sealing means arranged between the reservoir and the lower end of the wick tube, a sealing member on the wick, and a packing element of resilient material on the sealing member, for entering the tubular sealing means when the wick has been raised into its topmost position by the raising means.

5. In a lantern, an oil reservoir, a wick tube, a wick in the tube, means for raising the wick, sealing means arranged between the reservoir and the lower end of the wick tube, a sealing member on the wick for making a seal with the sealing means when the wick has been raised into its topmost position by the raising means, and an abutment on the sealing member for engaging the lower end of the wick tube in the said topmost position.

6. In a lantern, an oil reservoir, a wick tube, a wick in the tube, means for raising the wick, a tubular burner seat arranged between the reservoir and the lower end of the wick tube, an inwardly projecting flange at the lower end of the burner seat, a burner inserted in the upper end of the burner seat with its base, a packing ring of resilient material arranged in the seat between the flange and the base, a sealing member, and a plug of non-resilient material on the member for entering the ring when the wick has been raised into its topmost position by the raising means.

7. In a lantern, an oil reservoir, a wick tube, a wick in the tube, means for raising the wick, a tubular burner seat arranged between the reservoir and the lower end of the wick tube, a sleeve arranged at the lower end of the wick tube and projecting downwardly from the lower end of the burner seat, a sealing member, a plate at the lower end of the sealing member, another plate spaced from the first-mentioned plate, a packing element of resilient material between the two plates, for entering the sleeve when the wick has been raised into its topmost position by the raising means, and means extending through the packing element for connecting the two plates.

8. In a lantern, an oil reservoir, a wick tube, a wick in the tube, a wick-raising pinion, a sheath arranged to be placed on the lower end of the wick and defining a slot, a rack in the sheath, a sealing member on the rack for making a seal with the sealing means when the wick has been raised into its topmost position by the pinion, and teeth on the rack which are exposed through the slot in the sheath, to be engaged by the pinion in said topmost position.

BRUNO NIER.